Patented Aug. 25, 1953

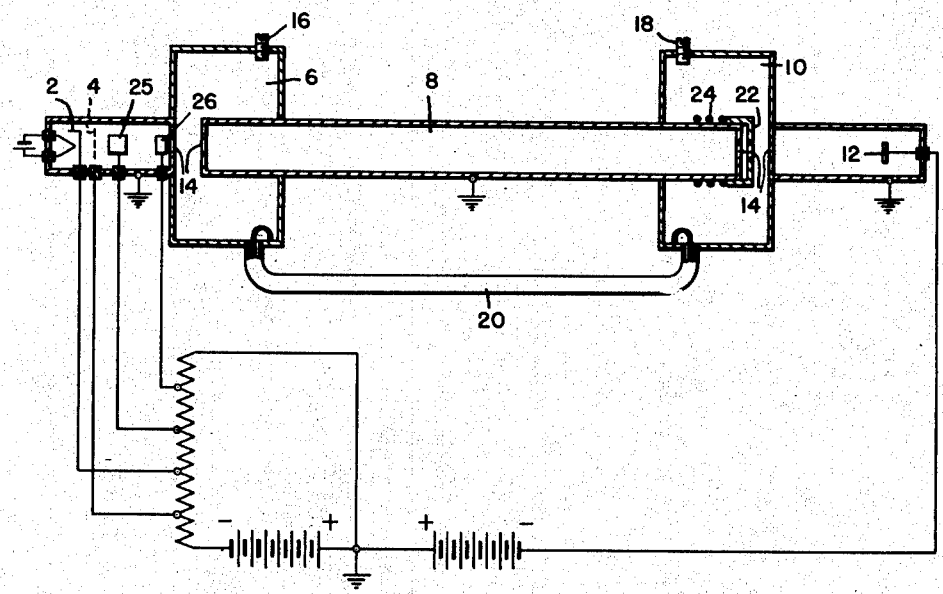

2,650,324

UNITED STATES PATENT OFFICE 2,650,324

SELF-TUNING KLYSTRON

Max Garbuny, Pittsburgh, Pa., assignor to Westinghouse Electric Corporation, East Pittsburgh, Pa., a corporation of Pennsylvania Application January 19, 1949, Serial No. 71,598

4 Claims. (Cl. 315—6)

My invention relates to oscillation generators, and more particularly to velocity-modulated oscillation generators employing self-tuning resonant cavities.

In the prior art devices of which I am aware, considerable difficulty has been encountered in tuning two cavity velocity-modulated tubes, such as the klystron, to a desired frequency. In an effort to overcome this, the reflex klystron has been adopted, but this device has the disadvantage of a high power loss.

It is, accordingly, an object of my invention to provide a two cavity velocity-modulated tube of high power which is easily tuned.

Another object of my invention is to provide a two cavity velocity-modulated tube in which one cavity is automatically self-tuning in response to the oscillations received from the other cavity.

An ancillary object of my invention is to provide a two cavity velocity-modulated amplifier, the resonant frequency of which will vary in response to the input oscillation.

In accordance with the present invention, I provide a two cavity velocity-modulated tube similar to the klystron. In each of the cavities is placed an adjustable probe for varying the frequency of the cavity, the depth of which may be varied manually. In one of the cavities, preferably the one nearest the anode, is placed a small responsive cap or probe attached by a spring to the body of the klystron. This responsive probe has been described in detail in my copending application Serial No. 65,963, filed December 17, 1948.

In accordance with one modification of my invention the responsive probe is so oriented with respect to the electric field generated in the cavity that it may have electric forces of attraction supplied thereto having a magnitude proportional to the square of the magnitude of the electric field. The responsive probe may be subjected to the reaction of a restoring force which opposes the force generated by the electric field. The probe then assumes a position such that the force generated by the electric field and the restoring force are equal and opposite for any frequency at which the cavity may be driven. A change in driving frequency from that of the resonance equilibrium will cause an unbalance of the electric and restoring forces. This unbalance is, in turn, used to change the position of the responsive probe in such a way as to restore the balance of forces and hence produce resonance at the changed driving frequency.

In a similar way, a constant power level is maintained inside the cavity. For a given probe position the electric force on it is sharply dependent on frequency in the resonance region. As long as the driving oscillations remain constant not only in frequency but also in power, the probe remains in a constant position. Should the magnitude of the driving signal vary, however, without changing frequency, the magnitude of the force generated within the cavity will likewise change, and the response of the tuning element to the change, will be to cause a small change in resonance frequency of the cavity such that the amplitude of the signals within the cavity will be maintained at a constant level. Thus, the cavity maintains a constant power level when the driving signal is constant independent of signal power deviations.

Likewise, should both the frequency and amplitude of the driving signal vary simultaneously from an original value, the resonant frequency of the cavity will be modified to such a value that the force applied to the probe by the electric field within the cavity will precisely counterbalance the restoring force applied to the probe. Thus the resonant frequency of the cavity will be maintained at such a value that the power level of the cavity at the driving frequency remains constant.

By employing this self-tuning cavity, the difficulty encountered in tuning two cavity klystrons of high power to a desired frequency can be substantially avoided. Once the tube is in operation, the frequency of the tube may be changed simply by adjusting the tuning probe in the known self-tuning cavity. This will change the frequency of the modulations entering the self-tuning cavity. The change in frequency will cause a change in the force on the self-tuning cavity causing it to move and compensate for the change in frequency. Thus, it is only necessary to tune one cavity.

In one embodiment of my invention, the self-tuning klystron is employed as an amplifier. This consists in using a broad beam responsive buncher cavity with a high Q catcher cavity, the catcher cavity containing a self-tuning probe. This cause the resonance frequency of our amplifier to vary in response to the frequency of the input oscillations.

The novel features that I consider characteristic of my invention are set forth with particularity in the appended claims. The invention itself, however, both as to its organization and its method of operation together with additional objects and advantages thereof will best be read in connection with the accompanying drawing; in which, the single figure is a schematic showing of apparatus employed in one embodiment of my invention.

Referring in detail to the drawing, a heated cathode 2 is employed as a source of electrons. Near the cathode are the biasing grid 4, focusing one or more grids 25 and the accelerating anode 26 which serves to produce an electron beam. In line with the cathode and focusing electrodes 25 and 26 is a buncher cavity 6. Connected to the buncher cavity by a metal connection tube 8 is the catcher cavity 10. Beyond the catcher cavity is the accelerating plate 12. The cathode 2, accelerating electrodes 25 and 26, buncher cavity 6, catcher cavity 10 and anode 12 are substantially in line so that the electrons leaving the cathode 2 will move directly toward the plate 12. There are openings 14 in the catcher cavity 10 and the buncher cavity 6 to allow the passage of the electrons through these cavities. Inserted in the side of the catcher cavity and the buncher cavity are adjustable probes 16, 18 for varying the impedance of the cavities and thus varying their resonant frequency. These probes 16, 18 are preferably manually adjustable.

If the apparatus is to be employed as an oscillator, the catcher cavity 10 and the buncher cavity 6 will be connected electrically, preferably by a co-axial cable 20.

Inside the catcher cavity is a metal responsive cap or probe 22 connected by a spring 24 to the connecting tube 8 between the cavities. This responsive probe 22 will move in response to a change in the electric force produced by the oscillating field within the cavity causing the catcher cavity to be self-tuning.

The electric force per unit area measured in gms./cm.² which is found to exist in an electric field is given by the following equation:

$$G = 4.52 E^2 \times 10^{-10} \text{ gms./cm.}^2$$

where E, the electric field strength at the responsive probe 22 is measured in volts/cm.

The magnitude of the electric field existing in the considered type of high Q, high power cavity is in the order of $10^6$ volts/cm. when, as an example, pulsed magnetrons are used. With a duty cycle of, say 2 microseconds at a repetition period of 1 millisecond, the average force per unit probe area is then in the order of 1 g./cm.².

Another equation to describe the electrical force on the probe is $$G = 9.04 \frac{PR}{d^2} \times 10^{-10} \text{g./cm.}^2$$

where P is the power level in watts which has been built up in the cavity, R the shunt resistance of the cavity in ohms and $d$ the spacing in cm. in which the field acting on the probe is confined. Again using an example, if we assume a typical klystron which generates 500 watts of power in a cavity of 1 cm. gap spacing and 2 million ohm shunt resistance, an electrical force on the probe in the order of 1 g./cm.² is obtained.

In either case, then, it will be evident that enough mechanical force is generated within a cavity operating at conventional power levels to actuate a probe for a distance of a few hundredths of a millimeter. Calculations show that a probe displacement equal to one hundredth of one per cent of the length of a typical cavity would change the resonant frequency of a cavity having a resonant frequency of 3000 megacycles by an amount of the order of one megacycle, indicating that the orders of magnitude of the effects involved in the system are sufficient to produce the results desired.

The responsive probe 22 is normally retained in a withdrawn position against the struture by means of the helical spring 24 designed to have a predetermined restoring force exerted on the probe against the force established by the electric field E which tends to move the probe away from the structure in opposition to the force exerted by the restoring spring independent of the direction which the alternating field might have at a given moment. When the alternating field changes in strength, the force on the probe changes, thus causing the probe to move.

In my copending application Serial No. 65,963, filed December 17, 1948, it is shown that as the frequency of the cavity changes, the probe will move in such a direction as to cause the resonant frequency of the cavity to approach the new frequency impressed on the cavity. The responsive probe will adjust itself to a new position, such that a relatively great reduction of frequency of the cavity will have taken place without material change in the amplitude of the oscillations within the cavity.

In order to initiate an operation of the present system, it is essential that the generated frequency be started at a value for which the catcher cavity 10 is resonant in the rest position of the responsive probe 22 and thereafter varied gradually to a final desired value, the responsive probe acting continually to retune the cavity and to maintain correspondence between the cavity frequency and the driving frequency. This may also be accomplished by setting the driving frequency at a pre-established value and moving the responsive probe to a suitable position to establish frequency correspondence between the frequency of this source and the tuning of the cavity. The movement of the responsive probe may be produced by means of a magnet or manually from outside of the cavity.

The present system serves not only to adjust the frequency of a cavity, but also to keep the power level of the cavity constant independent of variations of generated power beyond the adjusted value, since an increase or a decrease in input power level acts on the responsive probe precisely as does a variation in frequency, by establishing a modified force on the responsive probe, which serves to vary the displacement thereof, whereby a new cavity resonance frequency is established, which serves to re-establish substantially the original amplitude of the field E which continues to alternate with the signal frequency.

In one embodiment of my invention I employ a self-tuning klystron as an oscillator. The catcher cavity 10 is preferably a high Q cavity, but the buncher cavity 6 may, at the expense of gain, have broad band response. To start the oscillator, the adjustable tuning probe 16 in the buncher cavity is adjusted gradually towards lower frequencies beginning with a frequency known to be above the resonant frequency corresponding to the rest position of the responsive tuning probe. As the adjustable tuning probe in the buncher cavity is changed, the frequency of the buncher cavity will also change. When the frequency of the buncher cavity reaches a frequency corresponding to the resonant frequency at the rest position of the responsive tuning probe, the klystron will begin to oscillate. By further reducing the frequency of the buncher cavity by adjusting the adjustable tuning probe, the responsive probe will be pulled into the field, thus maintaining the natural characteristics of the catcher cavity near resonance and at a constant power level. Adjustment of the adjustable tuning probe in the buncher cavity is continued until the desired frequency is reached.

I have thus avoided the difficulty of adjusting two cavities simultaneously to the same frequency. Instead, the catcher cavity in spite of its high Q and high power level, simply follows the buncher cavity to the desired frequency. The catcher cavity of the klystron will continue to maintain its resonant frequency near that of the buncher cavity even under detuning influences, such as load or temperature changes.

In another embodiment of my invention, the self-tuning klystrons may be employed as an amplifier. In the amplifier it is desirable to employ a broad band responsive buncher cavity with a high Q catcher cavity as with the oscillator. Here, however, the tuning of the klystron is produced by moving the adjustable tuning probe 18 in the catcher cavity until resonance occurs in the rest position of the responsive probe 22, while the signal to be amplified is being applied to the klystrons.

When the adjustable tuning probe 18 reaches the position where resonance occurs in the catcher cavity with the responsive probe 22 in the rest position, the responsive probe 22 will react to the forces applied by the electrical field and will continue to respond to adjustments of the adjustable tuning probe 18 so as to maintain the resonance frequency of the catcher cavity near the input frequency.

From what has been said so far, it is seen that it is desirable that the rest position of the responsive probe 22 correspond to a resonant frequency above that frequency which it is desired to operate the klystron. Thus, the responsive probe, in moving to that position corresponding to lower frequencies than the rest position, will be able to adjust itself to changes in input frequency and power.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A high-frequency oscillation generator comprising an envelope having therein a buncher cavity resonator, and a catcher cavity resonator, said catcher cavity resonator containing a metal cap, a resilient mounting for said cap connecting said cap to a wall of said catcher cavity, said mounting having an elasticity of a magnitude to allow the location of said cap to move in response to changes in the force exerted on it by the oscillations in the catcher cavity resonator so as to tune said catcher cavity resonator, said resilient mounting being the only support for said cap.

2. A high-frequency amplifier comprising an envelope having therein a source of electrons, a buncher cavity resonator, a catcher cavity resonator, and an anode, said catcher cavity resonator containing a metal cap, a resilient mounting for said cap connecting said cap to a wall of said cavity so as to allow the location of said cap to change in response to a change in the force exerted on it by the oscillations in the catcher cavity resonator, said resilient mounting being the only support for said cap.

3. A generator for electromagnetic oscillations comprising: a source of electrons, acceleration electrodes, a buncher cavity resonator, a catcher cavity resonator, an anode, said catcher cavity resonator containing a re-entrant projection, a metal cap substantially covering an end of said projection, a spring attached to said metal cap, said spring constituting the sole support for said metal cap, said spring having a strength such that said cap will move in response to a change in said field force.

4. A generator for electromagnetic oscillations comprising: a source of electrons, acceleration electrodes, a buncher cavity resonator, a catcher cavity resonator, an anode, said catcher cavity resonator containing a re-entrant projection, a metal cap substantially covering an end of said projection, spring means attached to said metal cap, said spring means constituting the sole support of said metal cap, and said spring means having a strength such that said cap will move in response to a change in said field force.

MAX GARBUNY.

References Cited in the file of this patent

UNITED STATES PATENTS

| Number | Name | Date |
|---|---|---|
| 1,605,911 | Banneitz | Nov. 9, 1926 |
| 2,027,751 | Nelson | Jan. 14, 1936 |
| 2,311,658 | Hansen et al. | Feb. 23, 1943 |
| 2,374,810 | Fremlin | May 1, 1945 |
| 2,388,289 | Ronci | Nov. 6, 1945 |
| 2,492,996 | Haxby | Jan. 3, 1950 |
| 2,501,152 | Becker | Mar. 21, 1950 |
| 2,531,214 | Harris et al. | Nov. 21, 1950 |